United States Patent [19]

Ikemori

[11] 4,299,452
[45] Nov. 10, 1981

[54] ZOOM LENS HAVING TWO MOVABLE LENS GROUPS

[75] Inventor: Keiji Ikemori, Yokohama, Japan
[73] Assignee: Canon Kabushiki Kaisha, Tokyo, Japan
[21] Appl. No.: 898,807
[22] Filed: Apr. 24, 1978

[30] Foreign Application Priority Data

Apr. 25, 1977 [JP] Japan ................... 52-47572

[51] Int. Cl.$^3$ ............................................. G02B 15/16
[52] U.S. Cl. ................................................. 350/426
[58] Field of Search .................... 350/184, 186, 426

[56] References Cited

U.S. PATENT DOCUMENTS

| | | | |
|---|---|---|---|
| 3,848,969 | 11/1974 | Tajima | 350/184 |
| 4,142,779 | 3/1979 | Ogawa | 350/184 |
| 4,147,410 | 4/1979 | Shimomura | 350/184 |
| 4,153,338 | 5/1979 | Fuji | 350/184 |
| 4,153,339 | 5/1979 | Tajima et al. | 350/184 |
| 4,155,629 | 5/1979 | Nakamura | 350/184 |
| 4,169,660 | 10/1979 | Nakamura | 350/184 |

*Primary Examiner*—Conrad J. Clark
*Attorney, Agent, or Firm*—Toren, McGeady & Stanger

[57] ABSTRACT

The present invention relates to a photographic lens capable of zooming by independently moving the front lens group and the rear lens group. The front lens group presents a negative meniscus lens, a biconcave lens and a positive lens, while the rear lens group presents two positive lenses, a positive meniscus lens, a biconcave lens and a positive lens. Let the focal length of the front lens group be Fl, the longest focal length of the total system be Ft and the distance between the secondary principal point of the front lens group and the primary principal point of the rear lens group when the focal length is Et, the zoom lens satisfies the following relations.

$$0.68 < \frac{|Fl|}{Ft} \leq 1 \quad 0.1 < \frac{Et}{Ft} < 0.31$$

6 Claims, 33 Drawing Figures

FIG.2A  FIG.2B  FIG.2C
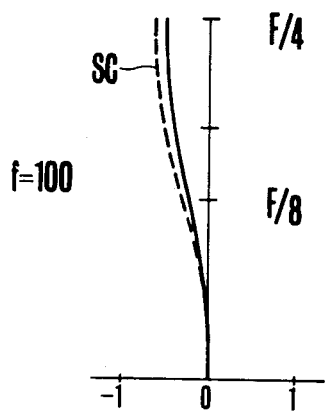 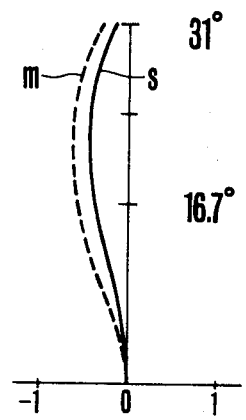 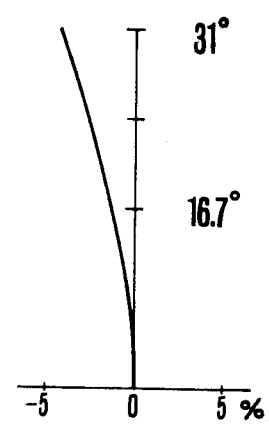
f=100
FIG.2D  FIG.2E  FIG.2F
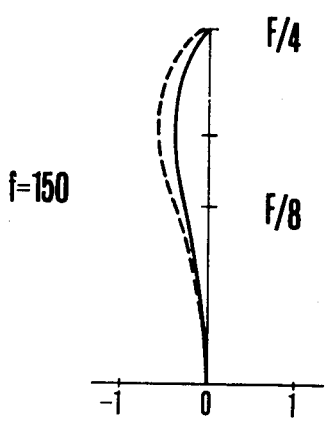 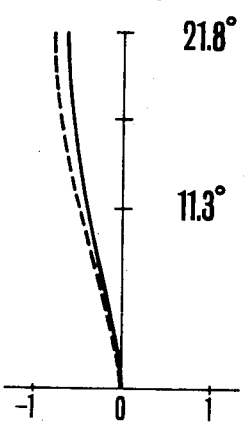 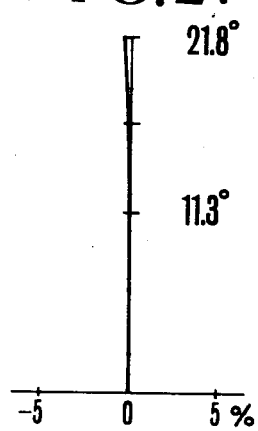
f=150
FIG.2G  FIG.2H  FIG.2I
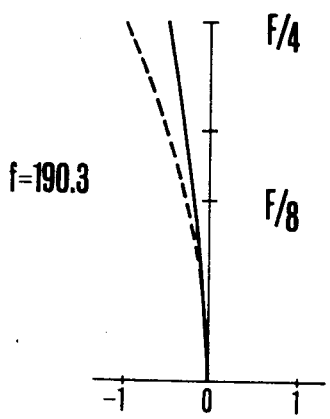 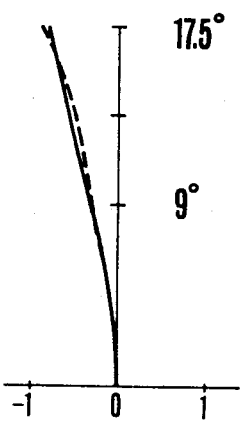 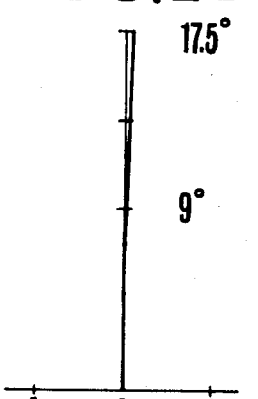
f=190.3
SPHERICAL ABERRATION
SINE CONDITION (S.C)     ASTIGMATISM     DISTORTION f=100, F/3.5, F/7
SC 31°, 16.7°
s, m

31°, 16.7° f=150, F/3.5, F/7

21.8°, 11.3°

21.8°, 11.3° f=191.7, F/3.5, F/7

17.4°, 8.9°

17.4°, 8.9°

SPHERICAL ABERRATION SINE CONDITION (S.C)    ASTIGMATISM    DISTORTION f=100 f=150 f=191.7

SPHERICAL ABERRATION
SINE CONDITION (S.C)

ASTIGMATISM

DISTORTION

ZOOM LENS HAVING TWO MOVABLE LENS GROUPS

BACKGROUND OF THE INVENTION

The present invention relates to a photographic lens consisting of a divergent front lens group and a convergent rear lens group, more particularly to a zoom lens capable of altering the focal length by changing the distance between the front lens group and the rear lens group.

The zoom lens of this type has long been known, while it is only quite recently that a lens with an image quality capable of being brought into practice has been realized.

In accordance with this system, the zoom lens is always of inverted telephoto arrangement regardless of the relative position of the front lens group to the rear lens group, being arranged in such a manner that the distortion which is the most remarkable of the aberrations taking place at the wide angle side, while the arrangement is not profitable for the compensation of the spherical aberration and the coma at the telephoto side. Consequently, the spherical aberration and the coma have so far been compensated only by prolonging the total length of the lens system or increasing the number of the lenses composing the system.

The U.S. Pat. No. 3,848,969 discloses a zoom lens of two lens groups, whereby the front lens group and the rear lens group respectively consist of five single lenses. Further in case of this zoom lens, the front lens group moves linearly during the zooming operation, while the rear lens group moves non-linearly for compensation operation. Further, one of the lenses in the front lens group consists of lanthanum crown glass.

SUMMARY OF THE INVENTION

The first purpose of the present invention is to offer a zoom lens whose front lens group consists of a small number of lenses, while the superior image quality is maintained.

The second purpose of the present invention is to shorten the total length of the lens system.

The third purpose of the present invention is to decrease the number of the large diameter lenses in the front lens group so as to cut the weight of the system.

The fourth purpose of the present invention is to obtain a satisfactory compensation for various aberrations without using any lenses consisting of special glass such as lanthanum crown glass.

Hereby, the zoom lens in accordance with the present invention is the one so designed that the zooming is carried out by changing the distance between the divergent front lens group and the convergent rear lens group. Hereby, the front lens group consists of a negative meniscus lens with a plane concave toward the image, a negative lens and a positive lens in sequence from the object side, whereby the air lens formed between the second negative lens and the positive lens assumes a meniscus shape, while the rear lens group consists of three positive lenses, a negative lens and a positive lens from the object, whereby the planes of the three positive lenses are convex toward the object. Hereby, the following relations are established.

$$0.68 < \frac{|F1|}{Ft} \leq 1 \quad (1)$$

$$0.1 < \frac{Et}{Ft} < 0.31 \quad (2)$$

whereby
- f1: Focal length of the front lens group
- Ft: Focal length of the total system at the end of the telephoto side
- Et: Distance between the principal point of the front lens group and that of the rear lens group at the end of the telephoto side.

Further, the following relation is established.

$$2.4 < \frac{fb}{fa} < 6$$

whereby
- fa: Synthesized focal length of the first two positive lenses out of the three positive lenses at the object side in the rear lens group.
- fb: Focal length of the third positive lens In case of the embodiments to be explained later, the front lens group consists of a negative meniscus lens with a plane convex toward the forward direction, a biconcave lens the radius of curvature of whose front plane is larger than that of the rear plane and a positive lens with a plane convex along the forward direction. Hereby the axial distance between the negative meniscus lens and the biconcave lens is larger than that between the biconcave lens and the positive lens.

Further, the rear lens group consists of two positive lens, a positive meniscus lens with a plane convex along the forward direction, a biconcave lens and a positive lens. Hereby, in case of the first and the third embodiment, during the zooming operation the front lens group moves backwards as the focal length of the total system becomes longer, and returns a little forwards. Further, in case of the second embodiment, the front lens group moves backwards and stops at the inflection point. On the other hand, the rear lens group moves forwards substantially linearly as the focal length becomes longer.

Namely, the trace of the front lens group include an inflection point so that the zooming effect can remarkably increased as compared with the conventional zoom lens whose front lens group stops far before the inflection point. In consequently, in case of the same zooming ratio, the aberrations can be compensated much more easily. Hereby, in the present specification "along the forward direction" is used in the meaning of "object side", while "along the backward direction" is used in the meaning of "image side".

BRIEF DESCRIPTION OF THE DRAWINGS

FIGS. 2A–2C respectively show various aberrations at the end of the wide angle side of the first embodiment.

FIGS. 2D–2F respectively show various aberrations in the middle of the first embodiment.

FIGS. 2G–2I respectively show various aberrations at the end of the telephoto side of the first embodiment.

DESCRIPTION OF THE PREFERRED EMBODIMENTS

Figure 1:
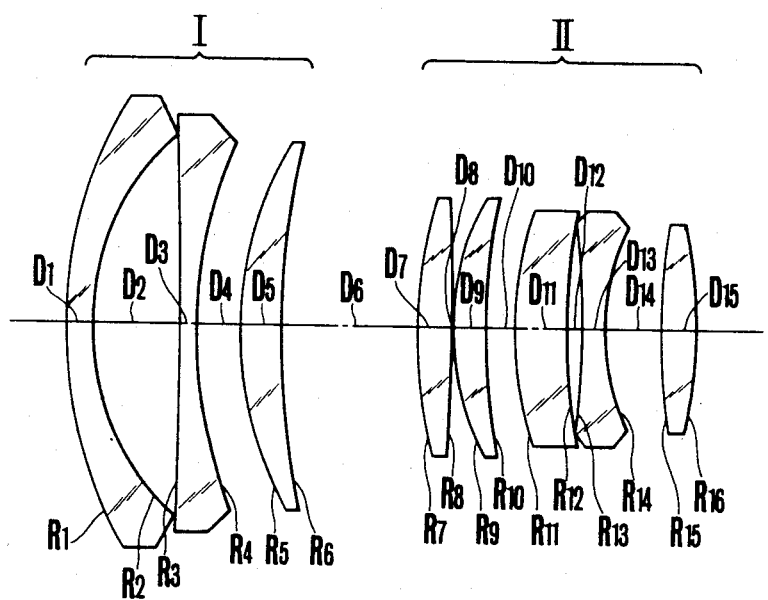
FIG. 1 shows the first embodiment of a lens in accordance with the present invention in section.
Figure 3:
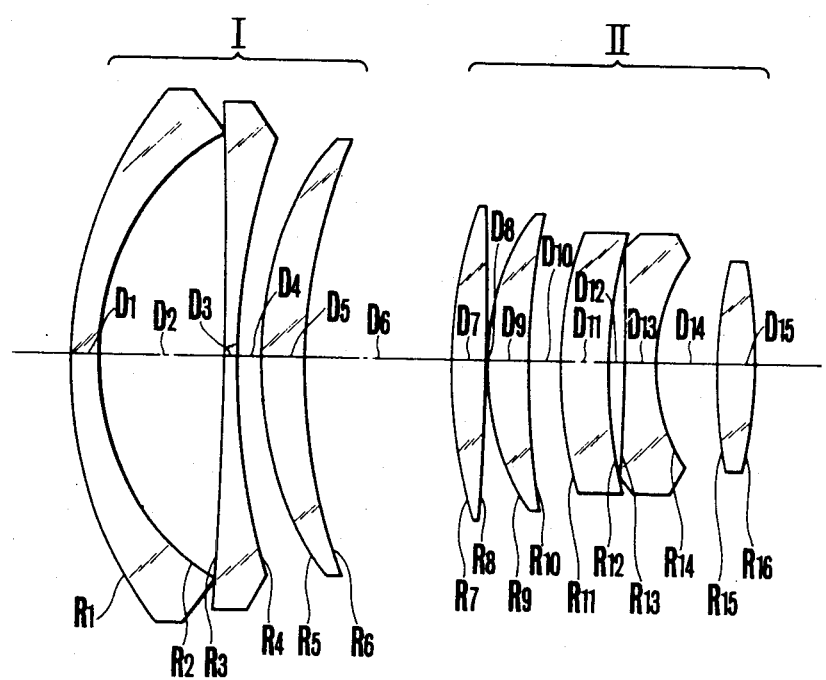
FIG. 3 shows the second embodiment of a lens in accordance with the present invention in section.
Figure 4A:
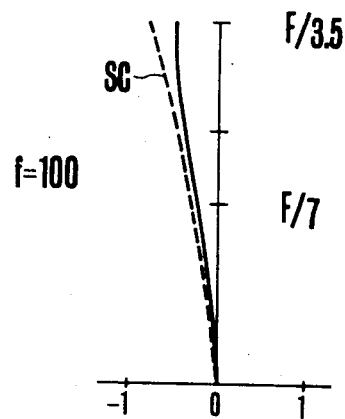
FIGS. 4A–4C respectively show various aberrations at the end of the wide angle side of the second embodiment.
Figure 4B:
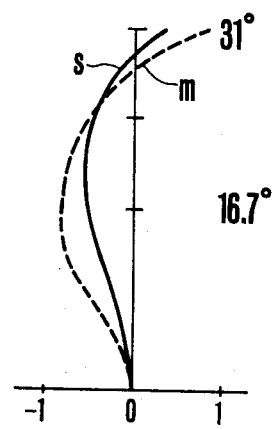
Figure 4C:
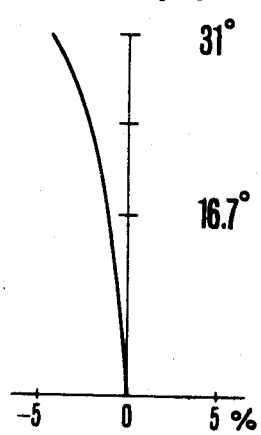
Figure 4D:
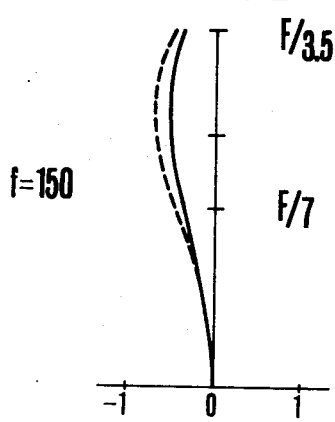
FIGS. 4D–4F respectively show various aberrations in the middle of the second embodiment.
Figure 4E:
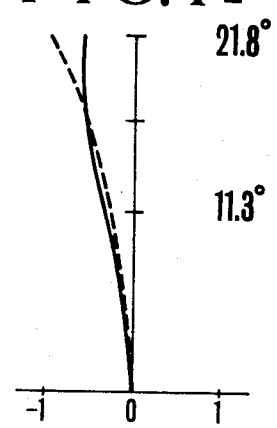
Figure 4F:
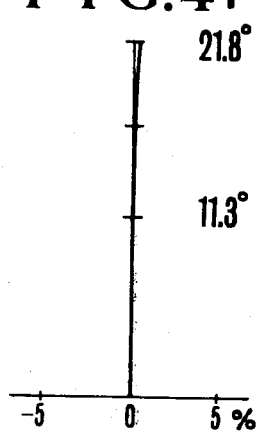
Figure 4G:
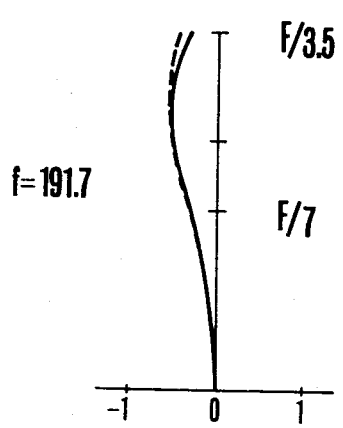
FIGS. 4G–4I respectively show various aberrations at the end of the telephoto side of the second embodiment.
Figure 4H:
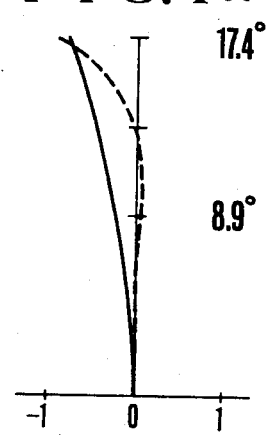
Figure 4I:
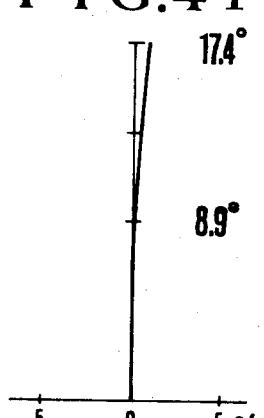

The afore mentioned relations (1) and (2) are the conditions for realizing a compact system with superior efficiency.

Beyond the upper limit value in accordance with relation (1), it is convenient for the compensation of the aberrations at the telephoto side, while the divergency of the front lens group becomes so weak that the distance between the front lens group and the rear lens group at the end of the wide angle side becomes large in such a manner that the diameter of the front lens becomes large, whereby the whole system becomes remarkably large.

On the other hand, beyond the lower limit value the divergency of the front lens group becomes so large that more varrel distortion takes place at the wide angle side beyond tolerance. Further, the distance between the front lens group and the rear lens group becomes small so that the total length of the lens system becomes small, whereby the back focal length becomes unnecessarily long so that the distance between the first lens plane and the image plane becomes large contrary to the expectation. Beyond the upper limit value in accordance with the relation (2) the largest diameter of the effective light beam of the rear lens group becomes too large to be applied for the large aperture, while the back focal length at the wide angle side becomes large beyond necessity and the total system becomes large. Beyond the lower limit value the distance between the front lens group and the rear lens group becomes negative and in accordance with the lens arrangement to be explained later the lenses are substantially in collision with each other, which means that the system is unrealizable.

Namely, the front lens group consists of a negative meniscus lens with a concave plane at the object side, a negative lens and a positive lens in sequence from the object side to the image side, whereby an air lens between the second negative lens and the following positive lens present a meniscus shape convex toward the object side, and the radius of curvature of the image side plane of the negative lens is larger than that of the object side plane, while the radius of curvature of the object side plane of the positive lens is larger than that of the image side.

Hereby, the shape of the negative meniscus lens is effective for reducing the barrel distorsion taking place at the wide angle side remarkably and compensating the astigmatism profitably. Further, the air lens formed between the negative lens and the positive lens serves to reduce the too much spherical aberration taking place mostly due to the front lens group particularly at the telephoto side. Further, the three lenses are shaped in such a manner that the second principal plane of the front lens group is as close to the image plane in order to prevent the collision of the front lens group with the rear lens group even when the both lens groups are closest to each other.

The rear lens group consists of three positive lenses, a negative lens and a positive lens in sequence from the object side, whereby the radius of curvature of the object side plane of each of the three positive lenses is larger than that of the image side plane, while the lenses are convex toward the object.

Hereby, the fact that all of the object side planes of the three positive lenses at the side of the object are convex toward the object, each having a large radius of curvature is effective for bringing the first principal plane of the rear lens group as close to the object as possible in order to prevent the collision of the lenses with each other in combination with the afore mentioned effect even when the distance between the principal plane of the front lens group and that of the rear lens group is small to some extent at the end of the telephoto side so as to realize a compact lens system as a whole.

Further, all over the zooming range, an under astigmatism is produced by means of the three positive lens and the closer to the telephoto side the more under spherical aberration takes place, whereby these aberrations are compensated by means of a negative lens.

In order to compensate the astigmatism and the spherical aberration properly at the same time at this time, the image side plane of the negative lens has to be at least a concave plane with a large radius of curvature.

The last positive lens in the rear lens group serves to keep a necessary amount of the back focal length at the end of the wide angle lens as well as a proper balance amoung the aberrations as a whole.

Figure 5:
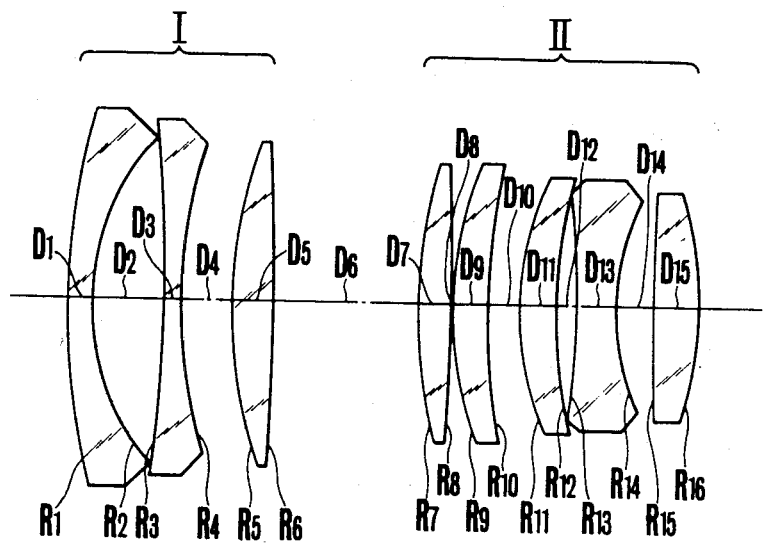
FIG. 5 shows the third embodiment of a lens in accordance with the present invention in section.
Figure 6A:
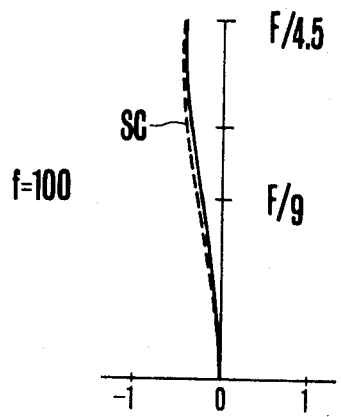
FIGS. 6A–6C respectively show various aberrations at the end of the wide angle lens of the third embodiment.
Figure 6B:
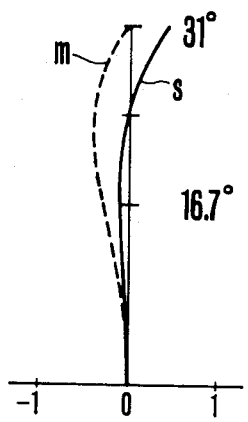
Figure 6C:
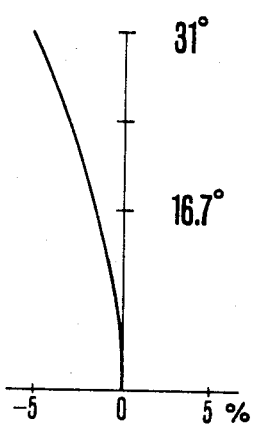
Figure 6D:
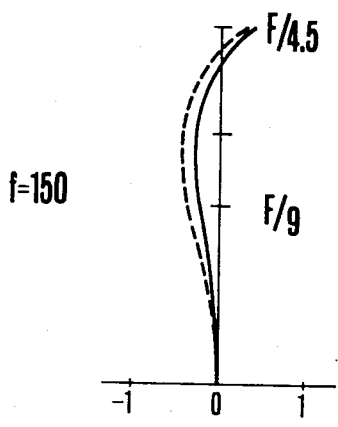
FIGS. 6D–6F respectively show various aberrations in the middle of the third embodiment.
Figure 6E:
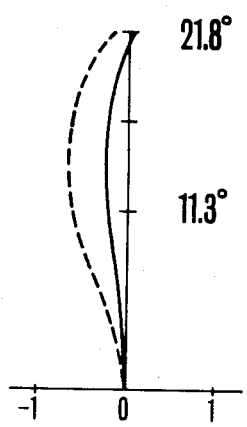
Figure 6F:
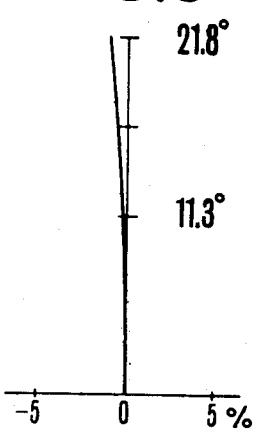
Figure 6G:
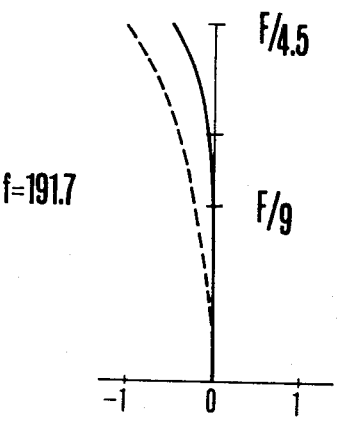
FIGS. 6G–6I respectively show various aberrations at the end of the telephoto side of the third embodiment.
Figure 6H:
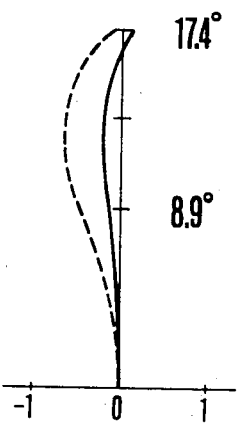
Figure 6I:
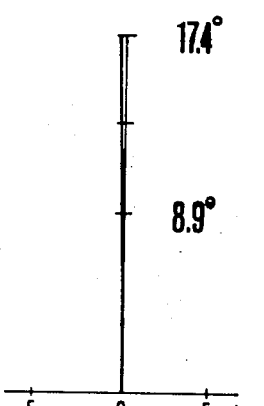

The above is the basic arrangement, whereby the further details are explained in accordance with the embodiment. In FIG. 1 and FIG. 5, I is a divergent front lens group, while II is a convergent rear lens group. During the zooming operation from the wide angle side toward the telephoto side the rear lens group (II) travels linearly from the image side to the object side, while the front lens group (I) travels from the object side to the image side and again along the direction toward the object at the telephoto side in order to keep the image plane at a certain determined position. The first lens group consists of a negative meniscus lens (R1, R2) with a concave plane toward the image side, an at both sides concave lens (R3, R4) the radius of curvature of whose object side plane is larger than that of the image side plane and a positive meniscus lens (R5, R6) convex toward the object side, the radius of whose image side plane is larger or an a both sides convex lens (R5, R6) in sequence from the object side. Hereby, R3 can be plane or slightly convex toward the object side.

Further, the rear lens group consists of an at both sides convex lens (R7, R8), two at object side convex positive meniscus lenses (R9, R10) (R11, R12), a plane-concave lens (R13, R14) the radius of curvature of whose object side plane is larger or a both side concave lens (R13, R14) and a both side convex lens (R15, R16) in sequence from the object side.

Hereby, even if the planes R8, R13 and R15 are otherwise shaped than in case of the embodiment, the aberration are hardly deteriorated.

Hereby, what is important as to the rear lens group is to strengthen the power of the first block consisting of the first and the second positive lens more than that of the third lens and to widen the distance between the block and the lens. Namely, let the synthesized focal length of the first and the second positive lens out of the rear lens group be fa and the focal length of the third positive lens be fb, the following relation is obtained.

$$2.4 < \frac{fb}{fa} < 6$$

Namely, the lens system can be made compact while the efficiency can be raised by means of increasing the convergency of the lens closest to the object to some extent.

Beyond the above mentioned upper limit value, the first principal plane of the rear lens group can not assume the desired position in such a manner that the rear lens comes in collision with the front lens group at the end of the telephoto side. Further, beyond the lower limit value, an under astigmatism is produced by means of the two positive lenses in sequence from the object all over the zooming lens while closer to the telephoto side the more the under spherical aberration is produced, whereby in order to compensate these aberrations at the same time it is necessary to increase the divergency of the negative lens in the rear lens and the radius of curvature at the image side remarkably. As the result, many aberrations of higher harmonies are produced in such a manner that it becomes difficult to realize a large aperture and compensate the aberrations properly. Hereby, the diaphragm is provided between R10 and R11. Further as to the chromatic aberration it is better to improve that of the front lens group and that of the rear lens group independently. This is in order to prevent the alteration of the chromatic aberration due to the alteration of the focal length or the alteration of the object distance when the front lens group is advanced independently.

Consequently due to the convergent effect of the front lens group the first and the second negative lenses are composed of low dispersion glass while the positive lens is composed of high dispersion glass. Further, as to the rear lens group, due to the convergent effect it is desirable that the three positive lenses at the object side are composed of low dispersion glass, while the negative lens is composed of high dispersion glass. Namely, it is one of the solution to choose the Abbe's number of the two negative lenses in the front lens group and that of the three positive lenses at the object side to be larger than 45 and the Abbe's number of the positive lens in the front lens group and that of the negative lens in the rear lens group to be smaller than 40.

Further, when the afore mentioned conditions are all satisfied, it is possible to compose all of the lens system only with glass not including any rare element, still keeping good efficiency. Namely, as is applied in the embodiment to be explained later, the two negative lenses in the front lens group and the three positive lenses of the rear lens group at the object side consist of dense crown [dense barium crown] or extra dense crown [extra dense barium crown] glass, the positive lens in the front lens group and the rear lens group consist of flint or dense flint glass and the last positive lens in the rear lens group consists of flint glass.

Being composed in a compact and a simple way, consisting of only glass stable in quality, low in price, not including any rare element, the whole lens system including the lens barrel becomes remarkably compact, superior in portability, low in price and convenient in mass production. Hereby, it goes without saying that the lens system can also be realized with glass including rare element.

In this way, as is in case of the embodiment, remarkably compact zoom lenses with high efficiency have been realized by means of eight lens composition not including any rare element in such a manner that the picture angle covers 62°–34.8° (respectively 35.5°), the F-number covers 3.5–4.5 and the total length (between the first plane and the picture plane) at the end of the wide angle side is only 8.3 times as long as the focal length at the end of the wide angle side.

EMBODIMENT 1

Focal length f = 100 − 190.3 FNo. = 4
Picture angle FA = 62° − 35.05°

| Radius of curvature | | Lens thickness & Lens distance | Refractive index (Nd) | Abbe number (Vd) |
|---|---|---|---|---|
| R1 | 101.799 | D1 5. | N1 1.65844 | V1 50.9 |
| R2 | 58.7639 | D2 20.95 | | |
| R3 | −2567.561 | D3 3.61 | N2 1.65844 | V2 50.9 |
| R4 | 109.0964 | D4 12.06 | | |
| R5 | 90.9147 | D5 9.36 | N3 1.7552 | V3 27.5 |
| R6 | 185.0424 | l | | |
| R7 | 107.2556 | D6 8.17 | N4 1.60311 | V4 60.7 |
| R8 | −1095.825 | D7 0.42 | | |
| R9 | 66.0308 | D8 8.51 | N5 1.60311 | V5 60.7 |
| R10 | 180.8917 | D9 6.67 | | |
| R11 | 83.1661 | D10 12.61 | N6 1.60311 | V6 60.7 |
| R12 | 139.4522 | D11 2.68 | | |
| R13 | −463.8195 | D12 5.12 | N7 1.80518 | V7 25.4 |
| R14 | 50.2922 | D13 13.26 | | |
| R15 | 219.199 | D14 8.83 | N8 1.63636 | V8 35.4 |
| R16 | −100.9856 | | | | l = 84.69 − 26.12 − 1.32
F1 = −161.11
Et = 40.27
Lw = 324.

(Distance between the first plane and the image plane at the end of the wide angle side)

EMBODIMENT 2

Focal length f = 100 − 191.7 FNo. = 3.5
Picture angle FA = 62° − 34.8°

| Radius of curvature | | Lens thickness & Lens distance | Refractive index (Nd) | Abbe number (Vd) |
|---|---|---|---|---|
| R1 | 103.566 | D1 5.56 | N1 1.65844 | V1 50.9 |
| R2 | 62.8298 | D2 29.11 | | |
| R3 | −1473.732 | D3 3.61 | N2 1.63854 | V2 55.4 |
| R4 | 171.7279 | D4 5.71 | | |
| R5 | 89.5863 | D5 10.56 | N3 1.68893 | V3 31.1 |
| R6 | 141.3738 | l | | |
| R7 | 113.3528 | D6 7.5 | N4 1.65844 | V4 50.9 |
| R8 | −1863.216 | D7 0.42 | | |
| R9 | 60.8953 | D8 9.17 | N5 1.60311 | V5 60.7 |
| R10 | 185.7648 | D9 6.94 | | |
| R11 | 86.7785 | D10 12.03 | N6 1.60311 | V6 60.7 |
| R12 | 124.0226 | D11 2.92 | | |
| R13 | −1419.585 | D12 7.55 | N7 1.80518 | V7 25.4 |
| R14 | 45.2119 | D13 15.67 | | |
| R15 | 144.819 | D14 7.5 | N8 1.63636 | V8 35.4 |

-continued

Focal length f = 100 − 191.7 FNo. = 3.5
Picture angle FA = 62° − 34.8°

| Radius of curvature | Lens thickness & Lens distance | Refractive index (Nd) | Abbe number (Vd) |
|---|---|---|---|
| R16 −144.127 | | | | l = 103.43 − 33.33 − 2.85
Fl = −191.7
Et = 27.78
Lw = 322

EMBODIMENT 3

Focal length f = 100 − 191.7 FNo. = 4.5
Picture angle FA = 62° − 34.8°

| Radius of curvature | | Lens thickness & Lens distance | | Refractory index (Nd) | Abbe number |
|---|---|---|---|---|---|
| R1 | 164.8231 | D1 | 5.56 | N1 1.65844 | V1 50.9 |
| R2 | 57.3466 | D2 | 16. | | |
| R3 | −315.5245 | D3 | 3.61 | N2 1.65844 | V2 50.9 |
| R4 | 119.4922 | D4 | 12.34 | | |
| R5 | 102.9216 | D5 | 9.72 | N3 1.60342 | V3 38. |
| R6 | −923.974 | 1 | | | |
| R7 | 124.2773 | D6 | 7.78 | N4 1.65844 | V4 50.9 |
| R8 | 861.739 | D7 | 0.42 | | |
| R9 | 82.2475 | D8 | 9.44 | N5 1.60311 | V5 60.7 |
| R10 | 197.0104 | D9 | 7.22 | | |
| R11 | 73.5102 | D10 | 8.55 | N6 1.60311 | V6 60.7 |
| R12 | 132.9075 | D11 | 3.79 | | |
| R13 | −437.221 | D12 | 10.34 | N7 1.80518 | V7 25.4 |
| R14 | 57.8737 | D13 | 8.57 | | |
| R15 | 618.1303 | D14 | 7.5 | N8 1.63636 | V8 35.4 |
| R16 | −85.2843 | | | | | l = 80.75 − 28.56 − 5.86
Fl = −138.9
Et = 55.56
Lw = 334

| Lens | Embodiment 1 | Embodiment 2 | Embodiment 3 |
|---|---|---|---|
| 1 | SSK | SSK | SSK |
| 2 | SSK | SK | SSK |
| 3 | SF | SF | F |
| 4 | SK | SSK | SSK |
| 5 | SK | SK | SK |
| 6 | SK | SK | SK |
| 7 | SF | SF | SF |
| 8 | F | F | F |

SK dense crown
SSK extra dense crown
F flint
SF dense flint

| | Embodiment 1 | Embodiment 2 | Embodiment 3 |
|---|---|---|---|
| \|Fl\|/Ft | 0.847 | 1 | 0.725 |
| Et/Ft | 0.212 | 0.145 | 0.29 |
| fb/fa | 3.79 | 5.52 | 2.7 |

What is claimed is:

1. A zoom lens having two movable lens groups comprising:
    a front lens group having a negative refracting power, being movable along the axial direction and consisting of a negative meniscus lens with a surface convex to the object, a negative lens with a surface concave to the image, and a positive lens with a surface convex to the object, in the aforementioned order, and
    a rear lens group having a positive refracting power, being movable along the axial direction simultaneously with the front lens group and having two positive lenses with a surface convex to the object, a positive meniscus lens with a surface convex to the object, a negative lens with a surface concave to the image, and a positive lens,
    whereby the following relations are satisfied $$0.68 < \frac{|Fl|}{Ft} \leq 1$$

$$0.1 < \frac{Et}{Ft} < 0.31$$

$$2.4 < \frac{fb}{fa} < 6$$

wherein
  Fl: focal length of the front lens group
  Ft: longest focal length of the zoom lens
  Et: distance between the secondary principle point of the front lens group and the primary principle point of the rear lens group when the focal length of the zoom lens is Ft.
  fa: focal length of the two positive lenses in the rear lens group.
  fb: focal length of the positive meniscus lens in the rear lens group.

2. A zoom lens in accordance with claim 1, wherein the front lens group consists of a negative meniscus lens with a surface convex to the object, a biconcave lens the radius of whose rear surface is smaller than the absolute value of the radius of the front surface and a positive lens the absolute value of the radius of whose rear surface is larger than the radius of the front surface and the rear lens group consists of a positive lens of biconvex shape, a positive lens of meniscus shape, a positive meniscus lens, a biconcave lens the radius of whose rear surface is smaller than the absolute value of the front surface, and a positive lens.

3. A zoom lens having two movable lens groups comprising a front lens group, said lens group having a negative refracting power, being movable along the axial direction and consisting of a negative meniscus lens with a surface convex to the object, a biconcave lens the radius of whose rear surface is smaller than the absolute value of the radius of the front surface, and a positive meniscus lens with a surface convex to the object, a rear lens group, said lens group having a positive refracting power and movable simultaneously with the front lens group and consisting of a biconvex lens, two positive meniscus lenses with a surface convex to the object, a biconcave lens radius of whose rear surface is smaller than the absolute value of the front surface, and a positive lens,
    the distance between the negative meniscus lens and the biconcave lens in the front lens group being larger than that between the biconcave lens and the positive lens, and the negative meniscus lens of the front lens group made of extra dense crown glass, the rear lens group being arranged to move toward the object and the front lens group being arranged to move toward the image and then toward the object to increase the focal length of the entire system.

4. A zoom lens in accordance with claim 3, wherein the negative meniscus lens and the biconcave lens in the front lens group consisting of extra dense crown-glass while the positive meniscus lens in the front lens group consisting of dense flint glass.

5. A zoom lens in accordance with claim 3, wherein in the front lens group the negative meniscus lens consisting of extra dense crown glass, the biconcave lens consisting of dense crown glass lens and positive meniscus lens consisting of dense flint glass lens.

6. A zoom lens in accordance with claim 3, wherein in the front lens group the negative meniscus lens and the biconcave lens consisting of extra dense crown glass and the positive meniscus lens consisting of flint glass.

* * * * *